(12) United States Patent
Paik et al.

(10) Patent No.: US 10,872,398 B2
(45) Date of Patent: Dec. 22, 2020

(54) APPARATUS AND METHOD FOR REMOVING HAZE FROM IMAGE USING FUZZY MEMBERSHIP FUNCTION, AND COMPUTER PROGRAM FOR PERFORMING THE METHOD

(71) Applicant: CHUNG ANG UNIVERSITY INDUSTRY ACADEMIC COOPERATION FOUNDATION, Seoul (KR)

(72) Inventors: Joon Ki Paik, Seoul (KR); Ha Sil Park, Seoul (KR); Jin Ho Park, Suwon-si (KR); Hee Gwang Kim, Seoul (KR)

(73) Assignee: CHUNG ANG UNIVERSITY INDUSTRY ACADEMIC COOPERATION FOUNDATION, Seoul (KR)

( * ) Notice: Subject to any disclaimer, the term of this patent is extended or adjusted under 35 U.S.C. 154(b) by 157 days.

(21) Appl. No.: 16/190,609

(22) Filed: Nov. 14, 2018

(65) Prior Publication Data
US 2019/0147568 A1    May 16, 2019

(30) Foreign Application Priority Data

Nov. 14, 2017 (KR) .......................... 10-2017-0151687

(51) Int. Cl.
*G06K 9/40* (2006.01)
*G06T 5/00* (2006.01)

(52) U.S. Cl.
CPC .... *G06T 5/002* (2013.01); *G06T 2207/20016* (2013.01); *G06T 2207/20072* (2013.01)

(58) Field of Classification Search
None
See application file for complete search history.

(56) References Cited

U.S. PATENT DOCUMENTS

2016/0217556 A1* 7/2016 Agaian ................... G06T 5/003

OTHER PUBLICATIONS

Wang, Jyun-Guo, Shen-Chuan Tai, and Cheng-Jian Lin. "Image haze removal using a hybrid of fuzzy inference system and weighted estimation." Journal of Electronic Imaging 24.3 (2015): 033027. (Year: 2015).*

(Continued)

*Primary Examiner* — Sean M Conner
(74) *Attorney, Agent, or Firm* — Hauptman Ham, LLP

(57) ABSTRACT

The apparatus for removing haze from an image using a fuzzy membership function includes memory configured to store computer-readable instructions; and a processor configured to execute the instructions, wherein the processor calculates a hazy value and a transmission map using an input image including a hazy component and generates a restored image from which the hazy component has been removed using the hazy value and the transmission map, and wherein the processor selects a first area in the input image, calculates a fuzzy membership function of pixels of the input image with respect to the hazy value using brightness values of the pixels of the input image and brightness values of pixels of the first area, and calculates the transmission map using the brightness values of pixels of the first area and the fuzzy membership function.

8 Claims, 10 Drawing Sheets

(56) References Cited

OTHER PUBLICATIONS

Kim, Jin-Hwan, et al. "Optimized contrast enhancement for real-time image and video dehazing." Journal of Visual Communication and Image Representation 24.3 (2013): 410-425. (Year: 2013).*

Meng, Gaofeng, et al. "Efficient image dehazing with boundary constraint and contextual regularization." Proceedings of the IEEE international conference on computer vision. 2013. (Year: 2013).*

* cited by examiner

APPARATUS AND METHOD FOR REMOVING HAZE FROM IMAGE USING FUZZY MEMBERSHIP FUNCTION, AND COMPUTER PROGRAM FOR PERFORMING THE METHOD

CROSS-REFERENCE TO RELATED APPLICATIONS

This application claims the benefit of Korean Patent Application No. 10-2017-0151687, filed with the Korean Intellectual Property Office on Nov. 14, 2017, the disclosure of which is incorporated herein by reference in its entirety

BACKGROUND OF THE INVENTION

1. Field of the Invention

Embodiments of the present invention relate to an apparatus and a method for removing haze from an image using a fuzzy membership function to generate a high-quality restored image having no halo artifact and no loss in color contrast, and a computer program for performing the method.

The present invention is partly supported by Institute for Information & communications Technology Promotion (IITP) grant funded by the Korea government (MSIT) (2017-0-00250, Intelligent Defense Boundary Surveillance Technology Using Collaborative Reinforced Learning of Embedded Edge Camera and Image Analysis) and the ICT R&D program of MSIP/IITP (2014-0-00077, Development of global multi-target tracking and event prediction techniques based on real-time large-scale video analysis).

2. Description of the Related Art

Recently, researches on computer vision using camera sensors, such as autonomous vehicles, intelligent surveillance systems, intelligent unmanned systems, and guided weapons have been actively conducted. As such researches have been developed, a method of acquiring a high-quality image by improving an image deteriorated due to atmospheric environments is attracting attention as an important issue.

Haze in atmospheric air, which is generated in the process of acquiring an image, causes scattering of light reaching the camera, which distorts color contrast and color fidelity of the image, thereby deteriorating visibility. The problem of deterioration in visibility distorts information needed for detection and tracking of objects and recognition and analysis of images. For this reason, the reliability of image processing and computer vision algorithms is degraded. Therefore, it is very important to obtain high quality images by eliminating deterioration factors of an image of which the visibility is deteriorated in the preprocessing procedure of an intelligent image analysis algorithm using camera sensors.

In general, conventional haze removal algorithms can be roughly divided into two methods: a method based on image quality improvement and a method using a hazy model. Recently, a hazy removal method using the hazy model has been used in most of haze removal studies because it can fundamentally remove haze using a degree of light scattering due to haze.

Among them, the method of He et al. which is the most commercially available haze removal method using a hazy model estimates a transmission map using the Dark Channel Prior and removes haze. This is effective not only for removing haze, but also for improving quality of an underwater image, improving quality of a night image, and separating total reflection components. Since the Dark Channel Prior is a basic characteristic of an image which is not exposed to any distortion, the degree of distortion is estimated from an image damaged by various distortions and the image is restored.

However, the conventional haze removal method using a hazy model has a problem that halo artifact occurs due to a kernel operation, thereby deteriorating the image quality.

SUMMARY OF THE INVENTION

In order to solve the problems of the related art as described above, the present invention provides an apparatus and a method for removing haze from an image using a fuzzy membership function, and generating a high-quality restored image without loss of halo artifact and color contrast and a computer program for performing the method.

Other objects of the present invention may be derived by those skilled in the art through the following embodiments.

According to an aspect of the present invention, an apparatus for performing an operation of removing haze included in an image, includes memory configured to store computer-readable instructions; and a processor configured to execute the instructions, wherein the processor calculates a hazy value and a transmission map using an input image including a hazy component and generates a restored image from which the hazy component has been removed using the hazy value and the transmission map, and wherein the processor selects a first area in the input image, calculates a fuzzy membership function of pixels of the input image with respect to the hazy value using brightness values of the pixels of the input image and brightness values of pixels of the first area, and calculates the transmission map using the brightness values of pixels of the first area and the fuzzy membership function.

In addition, a function value of the fuzzy membership function may be determined using a brightness value A that is a minimum value of the brightness values of the pixels of the input image, a brightness value B that is a maximum value of the brightness values of the pixels of the input image, a brightness value C that is a minimum value of the brightness values of the first area, and a brightness value D that is a maximum value of the brightness values of the first area.

In addition, the processor may determine a function value for each of the pixels of the input image, wherein when a brightness value of a pixel of the input image is less than the brightness value A or greater than the brightness value B, the fuzzy membership function may have a function value of 0, wherein when a brightness value of a pixel of the input image is greater than or equal to the brightness value C and less than or equal to the brightness value D, the fuzzy membership function has a function value of 1, wherein when the brightness value of a pixel of the input image is greater than or equal to the brightness value A and less than the brightness value C, the fuzzy membership function has a function value of "1−(the brightness value C−the brightness value of the pixel of the input image)/(the brightness value C−the brightness value A)", and wherein when the brightness value of a pixel of the input image is greater than or equal to the brightness value D and less than the brightness value B, the fuzzy membership function has a function value of "1−(the brightness value of the pixel of the input image−the brightness value D)/(the brightness value B−the brightness value D)".

In addition, the fuzzy membership function, brightness values of the pixel of the input image, the brightness value A, the brightness value B, the brightness value C, and the brightness value D may be calculated or determined for each of R, G, and B channels.

In addition, the processor may calculate the transmission map using a fuzzy membership function for a R channel of the pixels of the input image, a fuzzy membership function for a G channel of the pixels of the input image, a fuzzy membership function for a B channel of the pixels of the input image, a mean value of the brightness value C and the brightness value D for the R channel, a mean value of the brightness value C and the brightness value D for the G channel, and a mean value of the brightness value C and the brightness value D for the B channel.

In addition, the transmission map may be expressed by the following equation:

$$T = 1 - \omega \cdot \frac{\mu_g^R \times \text{mean } A^R + \mu_g^G \times \text{mean } A^G + \mu_g^B \times \text{mean } A^B}{\text{mean } A^R + \text{mean } A^G + \text{mean } A^B}$$

where T is the transmission map, $\mu_g^R$ is the fuzzy membership function value for the R channel, $\mu_g^G$ is the fuzzy membership function value for the G channel, $\mu_g^B$ is the fuzzy membership function value for the B channel, mean $A^R$ is the mean value of the brightness value C and the brightness value D of the R channel, mean $A^G$ is the mean value of the brightness value C and the brightness value D for the G channel, mean $A^B$ is the mean value of the brightness value C and the brightness value D for the B channel, and ω is a parameter to control the amount of haze removal.

In addition, the first area may be an area having the maximum mean brightness value in the input area.

In addition, the processor may refine the transmission map using L1-norm regularization technique and generate the restored image using the refined transmission map.

According to another aspect of the present invention, a method for removing haze from an image, which is performed by an apparatus including a processor, includes the steps of: calculating a hazy value and a transmission map using an input image including a hazy component; and generating a restored image from which the hazy component has been removed using the hazy value and the transmission map, wherein the step of calculating selects a first area in the input image, calculates a fuzzy membership function of pixels of the input image with respect to the hazy value using brightness values of the pixels of the input image and brightness values of pixels of the first area, and calculates the transmission map using the brightness values of pixels of the first area and the fuzzy membership function.

According to another aspect of the present invention, a computer program product, which is stored on a computer-readable medium, includes instructions for causing a computer to execute the steps of: calculating a hazy value and a transmission map using an input image including a hazy component; and generating a restored image from which the hazy component has been removed using the hazy value and the transmission map, wherein the step of calculating selects a first area in the input image, calculates a fuzzy membership function of pixels of the input image with respect to the hazy value using brightness values of the pixels of the input image and brightness values of pixels of the first area, and calculates the transmission map using the brightness values of pixels of the first area and the fuzzy membership function.

According to the present invention, it is possible to remove haze from an image by using a fuzzy membership function and generate a high-quality restored image having no halo artifact and no loss in color contrast.

It should be understood that the effects of the present invention are not limited to the effects described above, but include all effects that can be deduced from the detailed description of the present invention or the configuration of the invention described in the claims.

DETAILED DESCRIPTION OF THE PREFERRED EMBODIMENTS

As used herein, the singular forms "a", "an" and "the" include plural referents unless the context clearly dictates otherwise. In this specification, the term "configure", "comprise", or the like should not be construed as necessarily including all of several elements or steps described herein, and accordingly, should be construed as not including some of the several elements or steps, or should be construed as further including additional component(s) or step(s). That is, the terms such as "part", "module" and the like described in the specification mean units for processing at least one function and operation and can be implemented by hardware components or software components, and combinations thereof.

Various embodiments of the present invention will now be described in detail with reference to the accompanying drawings. In this regards, the concept of a hazy model is first described and an apparatus and a method for removing haze from an image according to the present invention are then described.

Figure 1:
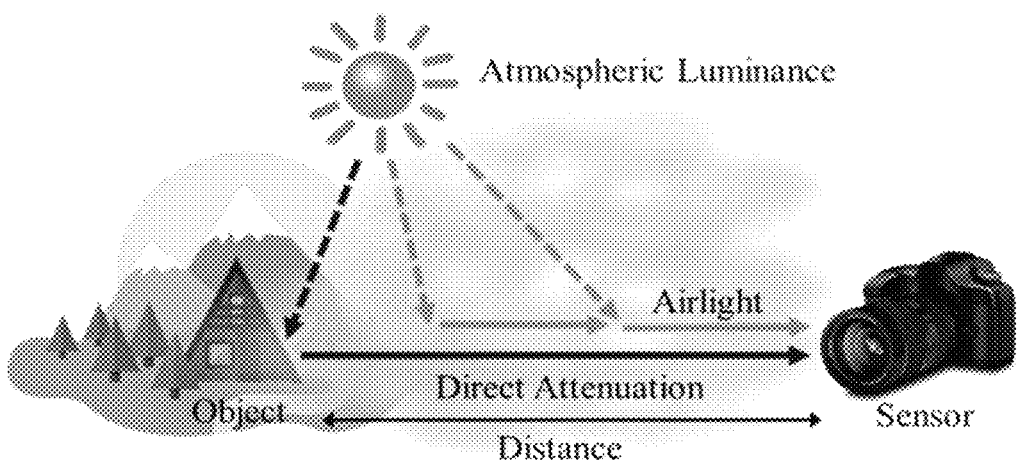
FIG. 1 is a diagram for describing the concept of a conventional hazy model.

FIG. 1 is a diagram for describing the concept of a conventional hazy model.

The model used in most haze removal algorithms has been proposed by Koschmieder. FIG. 1 illustrates a procedure by which a light source reaches the camera, and light reaching the camera includes light reflected directly from an object and light scattered by atmospheric factors such as haze or water vapor. In this case as the distance between the object and the camera increases, influence by the atmospheric factors such as haze increases. The hazy model used for haze removal may be expressed as Equation 1 below.

$$g(x) = f(x)T(x) + (1 - T(x))A \qquad \text{[Equation 1]}$$

Where g(x) is an image obtained by the camera (i.e., an observed image or input image including haze), x is a position of the image, f(x) is an image without haze (a restored image from which haze is removed), T(x) is a transmission or a transmission map (hereinafter referred to as a "transmission map") representing attenuation effect of the image, A is a hazy value or an atmospheric value (Hereinafter referred to as "hazy value") representing a degree of brightness of the haze. The transmission map may be expressed as Equation 2 below.

$$T(x)=e^{-\beta d(x)} \quad \text{[Equation 2]}$$

Where $\beta$ is a scattering coefficient by haze and d(x) is a depth of the image at the position x. The depth corresponds to a distance between the object and the camera. Referring to Equation 2, as the depth of the image increases, the degree of scattering of light by the hazy component increases and therefore, haze is generated intensely in the image.

At this time, the restored image from which the haze is removed may be calculated from the image obtained by the camera by estimating the hazy value and the transmission map, which may be expressed as Equation 3 below.

$$f(x)\frac{g(x)-A}{\max(T(x), t_0)}+A \quad \text{[Equation 3]}$$

Where $t_0$ is a lower limit of the transmission map, and is set to 0.01 experimentally.

The apparatus and method according to the present invention which perform an operation of removing haze from an image will be described below with reference to FIGS. 2 to 8.

Figure 2:
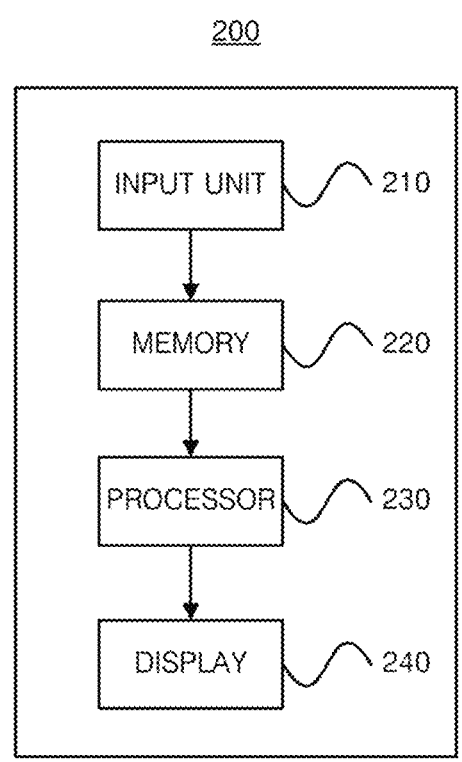
FIG. 2 is a diagram illustrating a schematic configuration of a terminal apparatus for removing haze from an image, according to an embodiment of the present invention.

FIG. 2 is a diagram illustrating a schematic configuration of a terminal apparatus for removing haze from an image, according to an embodiment of the present invention.

Referring to FIG. 2, the terminal apparatus 200 according to the embodiment of the present invention includes an input unit 210, memory 220, a processor 230, and a display 240.

The input unit 210 receives an input image including a hazy component. An input operation may be performed by a user.

The memory 220 may be volatile and/or non-volatile memory and may store instructions or data related to at least one other component of the terminal apparatus 200. In particular, the memory 220 may store instructions or data related to a computer program for generating a restored image by removing haze included in the input image. On the other hand, for convenience of description, it is described that "the computer program has been stored in the memory 220".

The processor 230 may include one or more of a central processing unit, an application processor, and a communication processor. For example, the processor 230 may perform operations and data processing related to the control and/or communication of at least one other component of the terminal apparatus 200. In particular, the processor 230 may execute instructions related to the execution of a computer program.

The display 240 may include a liquid crystal display (LCD), a light emitting diode (LED) display, an organic light emitting diode (OLED) display, and the like, and may display images to a user. In particular, the display 240 may output the execution screen of the computer program executed by the processor 230.

The above-described computer program is a computer program that performs an operation of removing haze included in the input image.

Operations performed in the terminal apparatus 200, in particular, in the processor 230, will be described in detail below with reference to FIGS. 3 to 8.

Figure 3:
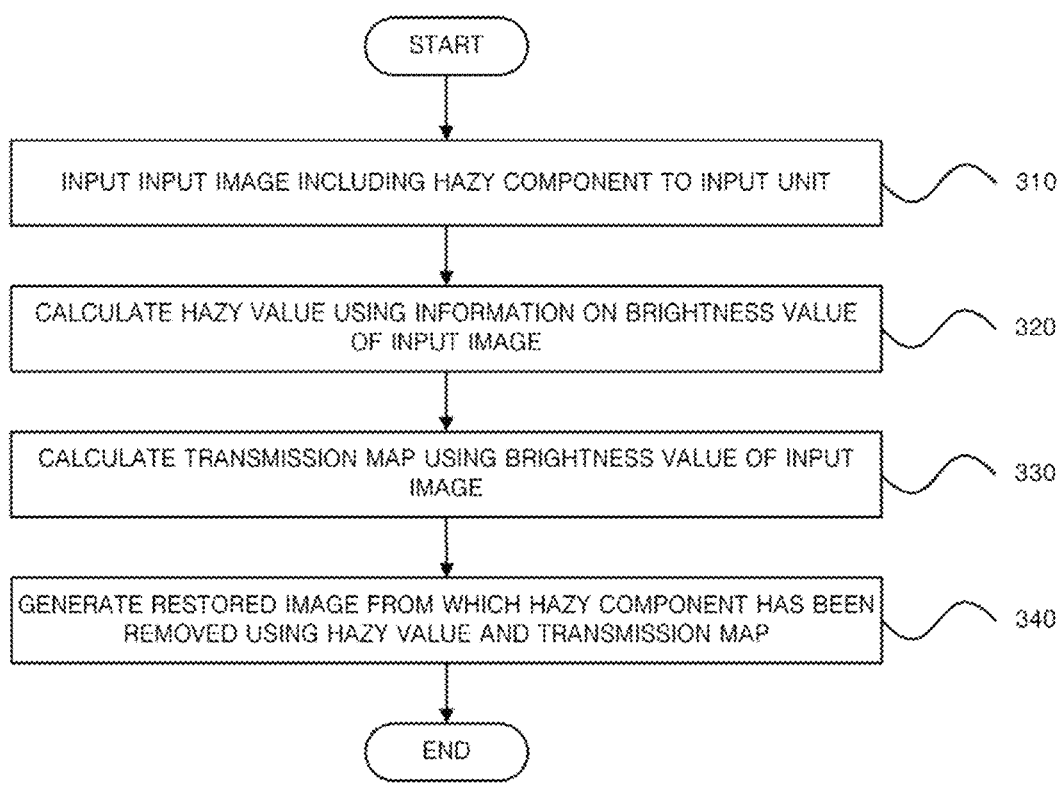
FIG. 3 is a flowchart of a method of removing haze included in an image, which is an operation of the terminal apparatus 200 according to an embodiment of the present invention.

FIG. 3 is a flowchart of a method of removing haze included in an image, which is an operation of the terminal apparatus 200, according to an embodiment of the present invention. Hereinafter, processing performed for each step will be described in detail.

First, in step 310, an input image including a hazy component is input to the input unit 210.

In step 320, the processor 230 calculates a hazy value using information on a brightness value of the input image.

According to an embodiment of the present invention, the processor 230 may select a hazy area that is an area with high haze in the input image, and calculate or estimate the hazy value using the selected hazy area. For convenience of description, the hazy area is referred to as a "first area".

As an example, the processor 230 may select the first area using a quad-tree subdivision method.

Figure 4A:
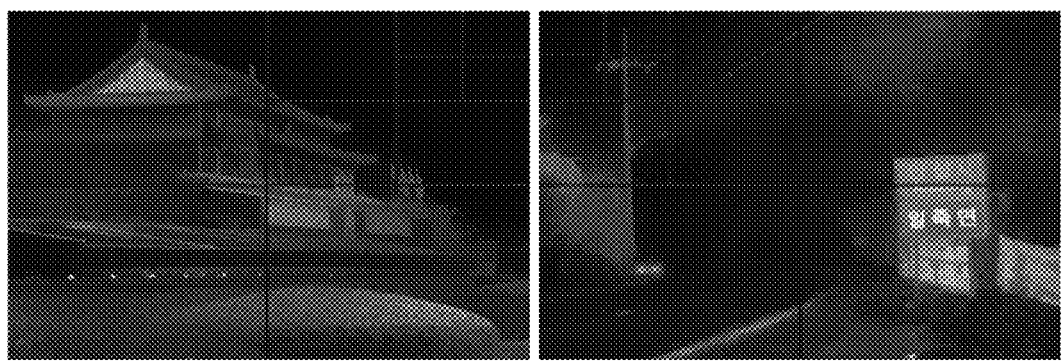
FIG. 4A and FIG. 4B illustrate the concept of the quad-tree subdivision method.
Figure 4B:
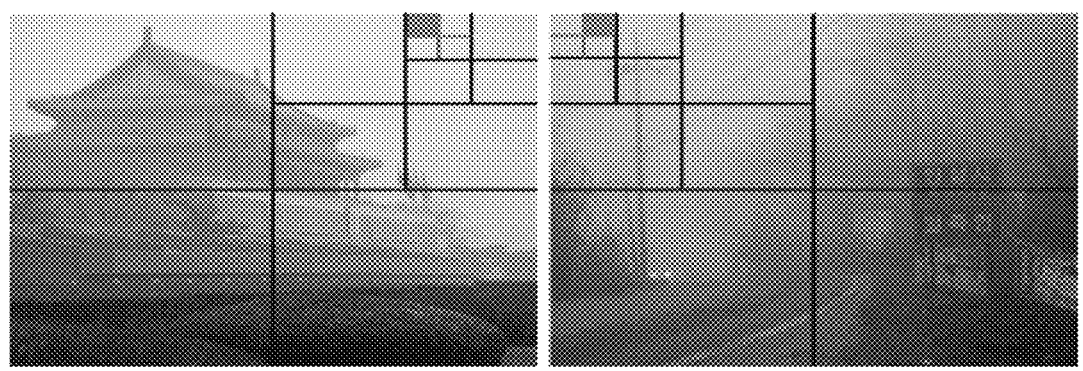

FIG. 4A and FIG. 4B illustrate the concept of the quad-tree subdivision method. Referring to FIG. 4A and FIG. 4B, the processor 230 may perform an operation of dividing the input image into four areas and selecting one area having the maximum mean brightness value among the four areas and may select the first area having a predetermined size by repeatedly performing the operation on the selected area. Therefore, the first area may be an area having the maximum mean brightness value in the input area. As an example, the first area may be set to have a size of 19×19 in a sky area or be selected to be 0.03 to 0.1% based on a high value of the brightness values of the pixels of the input image.

In step 330, the processor 230 calculates a transmission map using a brightness value of the input image.

According to an embodiment of the present invention, the processor 230 may calculate a fuzzy membership function of the pixels of the input image with respect to the hazy value using the brightness values of the pixels of the input image and the brightness values of the pixels of the first area in step 320 and calculate a transmission map using the brightness values of the pixels of the first area and the fuzzy membership function. Details will be described below.

The fuzzy theory is a mathematical theory that sets abstract and ambiguous expressions as scientific theories. A fuzzy set defines the degree of membership of an arbitrary element as a member function. The fuzzy theory is applied to the present invention as follows.

As described with reference to FIG. 1, in the case of assuming that the atmospheric haze is bright and thick at the deepest area of the image, the entire set is the "input image" and the fuzzy set for the hazy value may be expressed by Equation 4 below.

$$F=\{g(x),\mu_A(x)|g(x)\in g, 0<\mu_A(x)<1\} \quad \text{[Equation 4]}$$

Where F is a fuzzy function with respect to the hazy value, g(x) is brightness values of pixels of the input image, $\mu_A(x)$ is a fuzzy membership function of pixels of the input image with respect to the hazy value, and g is a hazy image (the entire set).

Referring to the above description, the processor 230 sets the first area obtained by the quad-tree subdivision method and calculates the membership (membership degree) of the pixels of the input image.

According to an embodiment of the present invention, the function value of the fuzzy membership function of each of the pixels of the input image may be determined using a minimum value (hereinafter referred to as "brightness value A") of the brightness values of the pixels of the input image, a maximum value (hereinafter referred to as "brightness value B") of the brightness values of the pixels of the input image, a minimum value (hereinafter referred to as "brightness value C") of the brightness values of the first area, and a maximum value (hereinafter referred to as "brightness value D") of the brightness values of the first area. In this case, the fuzzy membership function, the brightness values of the pixels of the input image, the brightness value A, the brightness value B, the brightness value C, and the brightness value D may be calculated or determined for each of R, G, and B channels.

Specifically, according to an embodiment of the present invention, when the brightness value of a pixel of the input image is less than the brightness value A or greater than the brightness value B, the fuzzy membership function may have a function value of 0. When the brightness value of a pixel of the input image is greater than or equal to the brightness value C and less than or equal to the brightness value D, the fuzzy membership function may have a function value of 1. When the brightness value of a pixel of the input image is greater than or equal to the brightness value A and less than the brightness value C, the fuzzy membership function may have a function value of "1−(the brightness value C−the brightness value of the pixel of the input image)/(the brightness value C−the brightness value A)". When the brightness value of a pixel of the input image is greater than or equal to the brightness value D and less than the brightness value B, the fuzzy membership function may have a function value of "1−(the brightness value of the pixel of the input image−the brightness value D)/(the brightness value B−the brightness value D)".

Figure 5:
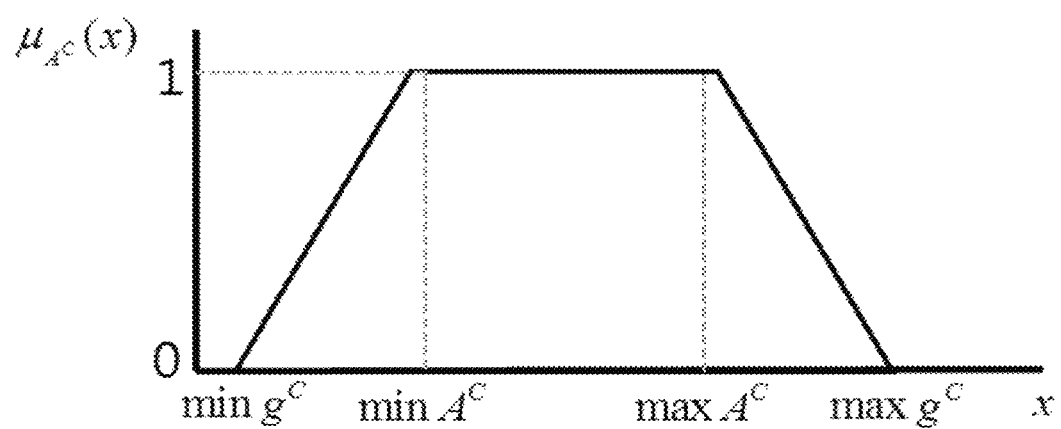
FIG. 5 illustrates a fuzzy membership function of pixels of an input image according to the present invention.

This may be expressed as Equation 5 below, and FIG. 5 illustrates the form of a fuzzy membership function of a pixel of an input image according to the present invention.

if $g^c(x) < \min g^C$ OR $g^c(x) > \max g^C$ $\mu_A{}^C(x) = 0$ else if $g^C(x) >= \min A^C$ AND $g^C(x) =< \max A^C$ $\mu_A{}^C(x) = 1$ else if $g^C(x) >= \min g^C$ AND $g^C(x) < \min A^C$ $\mu_A{}^C(x) = 1 - (\min A^C - g^C(x))/(\min A^C - \min g^C)$ else $\mu_A{}^C(x) = 1 - (g^C(x) - \max A^C)/(\max g^C - \max A^C)$ [Equation 5]

Where C is R, G, and B channels, $g^C(x)$ is a brightness value of a pixel of the input image for each of R, G, and B channels, $\mu_A{}^C(x)$ is a fuzzy membership function of pixels of the input image for each of R, G, and B channels, min $g^C$ is a brightness value A for each of R, G, and B channels, max $g^C$ is a brightness value A for each of R, G, and B channels, min $A^C$ is a brightness value C for each of R, G, and B channels, max $A^C$ is a brightness value D for each of R, G, and B channels.

Referring to FIG. 5 and Equation 5, a pixel value in a predetermined area is set as the first area (hazy value). Therefore, in the case of a trapezoidal fuzzy member ship function, all pixels $g^C(x)$ in a sky area having similar colors are mapped to the membership (membership degree) of 1. Therefore, it is possible to reduce color distortion occurring in the sky area and color distortion with respect to a white object. Also, as the depth of the image increases, the haze is thicker. As a result, the membership (membership degree) calculated using the fuzzy membership function becomes a depth map.

After the fuzzy membership function has been calculated, the processor 230 may calculate the transmission map using the brightness values of the pixels of the first area and the fuzzy membership function.

According to one embodiment of the present invention, the processor 230 may calculate the transmission map using a fuzzy membership function for the R channel of pixels of the input image, a fuzzy membership function for the G channel of pixels of the input image, a fuzzy membership function for the B channel of the pixels of the input image, a mean value of the brightness value C and the brightness value D for the R channel, a mean value of the brightness value C and the brightness value D for the G channel, and a mean value of the brightness value C and the brightness value D for the B channel.

As an example, the transmission map may be calculated as shown in Equation 6 below.

$$T = 1 - \omega \cdot \frac{\mu_g{}^R \times \text{mean } A^R + \mu_g{}^G \times \text{mean } A^G + \mu_g{}^B \times \text{mean } A^B}{\text{mean } A^R + \text{mean } A^G + \text{mean } A^B}$$ [Equation 6]

Where T is a transmission map, $\mu_g{}^R$ is the fuzzy membership function value for the R channel, $\mu_g{}^G$ is the fuzzy membership function value for the G channel, $\mu_g{}^B$ is the fuzzy membership function value for the B channel, mean $A^R$ is the mean value of the brightness value C and the brightness value D of the R channel, mean $A^G$ is the mean value of the brightness value C and the brightness value D for the G channel, mean $A^B$ is the mean value of the brightness value C and the brightness value D for the B channel and ω is a parameter to control the amount of haze removal.

Figure 6A:
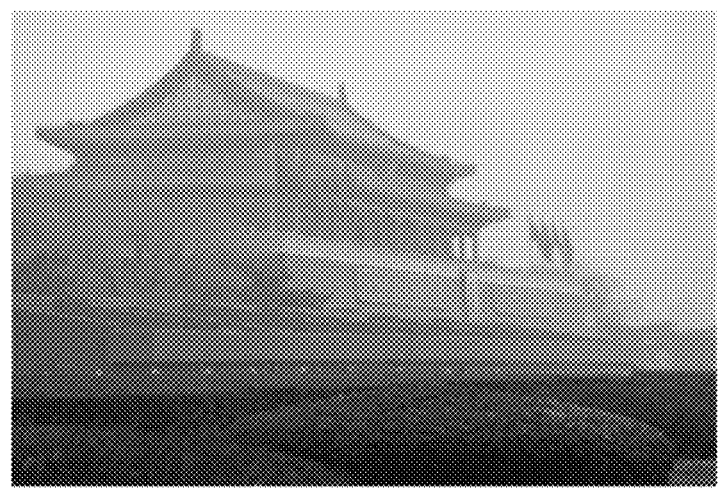
FIG. 6A, FIG. 6B, FIG. 6C and FIG. 6D are diagrams illustrating a mapping result of colors according to the transmission map.
Figure 6B:
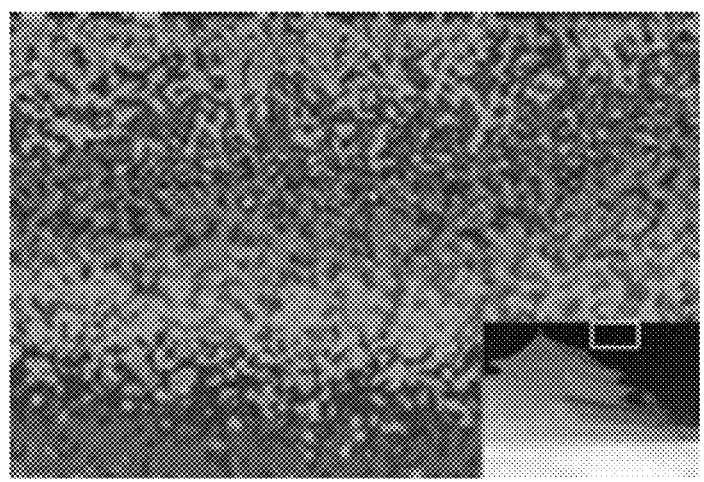
Figure 6C:
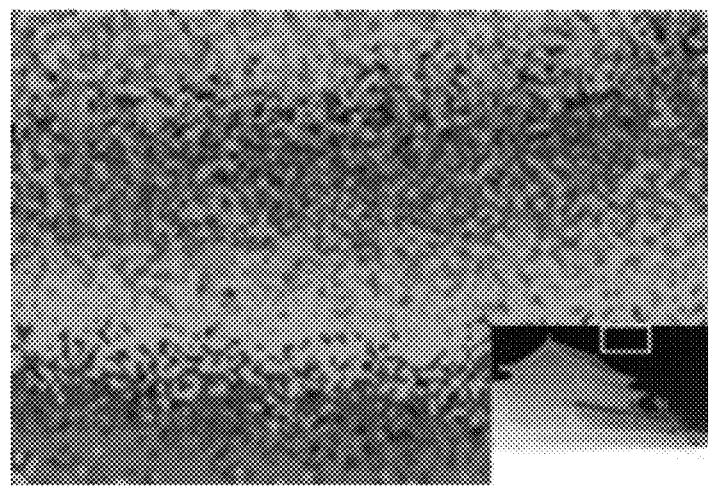
Figure 6D:
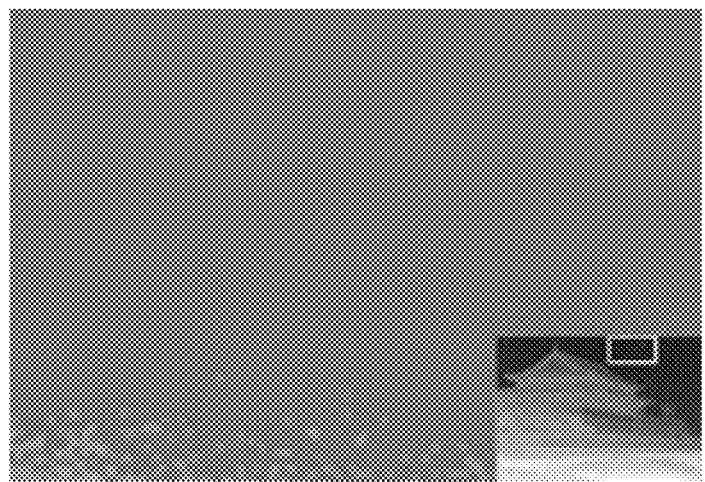

FIG. 6A, FIG. 6B, FIG. 6C and FIG. 6D are diagrams illustrating a mapping result of colors according to the transmission map. Specifically, FIG. 6A shows the input image, FIG. 6B shows a mapping result according to the method proposed by He et al. of conventional methods, FIG. 6C shows a mapping result according to the method proposed by Meng of conventional methods, and FIG. 6D shows a mapping result according to the present invention. In this case, the results were estimated and compared using a 1×1 kernel.

Referring to FIG. 6A, FIG. 6B, FIG. 6C and FIG. 6D, in the conventional methods, color distortion is caused because a different transmission map is estimated in the sky area. However, the present invention minimizes color distortion by continuously estimating the transmission map in the sky area.

Finally, in step 340, the processor 230 generates a restored image from which the hazy component is removed using the hazy value and the transmission map. In this case, the processor 230 may generate the restored image using Equation 3.

On the other hand, adjacent pixels in the hazy image (in the input image) are likely to be the same object, and therefore, have the same depth and the same transmission map. In addition, the present invention uses a pixel-based operation in order to prevent a backlight phenomenon caused by a kernel operation. Accordingly, there is a problem in that color contrast of the image after haze removal is lost because information of the adjacent pixels is not contained.

According to an embodiment of the present invention, the processor 230 calculates the transmission map, and then refines the transmission map by smoothing the transmission map through variational-based optimization.

The processor 230 may refine the transmission map using L1-norm regularization technique. In this case, the L1-norm regularization uses the ROF (Rudin, Oscher, Fatemi) model (see "Nonlinear total variation based noise removal algorithms"). An energy function for the transmission map may be expressed as Equation 7 below.

$$E(T) = \arg_T \min \|T - T_0\|_2 + \beta \|\nabla T\|_1 \quad \text{[Equation 7]}$$

Where E(T) is the energy function, $T_0$ is the transmission map calculated in step 330, $\|T-T_0\|_2$ is a data reliability term, $\|\nabla T\|_1$ is a smooth term, and β is a parameter for balancing the two terms.

At this time, applying the Euler-Lagrange differential and the gradient descent algorithm to Equation 7, a discretization equation for the time t may be obtained as shown in Equation 8 below.

$$T^{k+1} = T^k(1 - \Delta t) + \Delta t \left[ \left( \nabla \cdot \frac{\nabla T}{|\nabla T|} \right) + \frac{\beta}{2} \cdot T_0 \right] \quad \text{[Equation 8]}$$

Where Δ denotes a controlled convergence speed.

Figure 7A:
FIG. 7A and FIG. 7B illustrate transmission maps before and after refinement.
Figure 7B:

FIG. 7A illustrates transmission maps according to the present invention before refinement and FIG. 7B illustrates transmission maps according to the present invention after refinement.

Referring to FIG. 7A and FIG. 7B, it is confirmed that the image is smoothly displayed without loss in edges using the transmission map. Finally, the restored image is generated using the calculated transmission map and Equation 8.

Figure 8A:
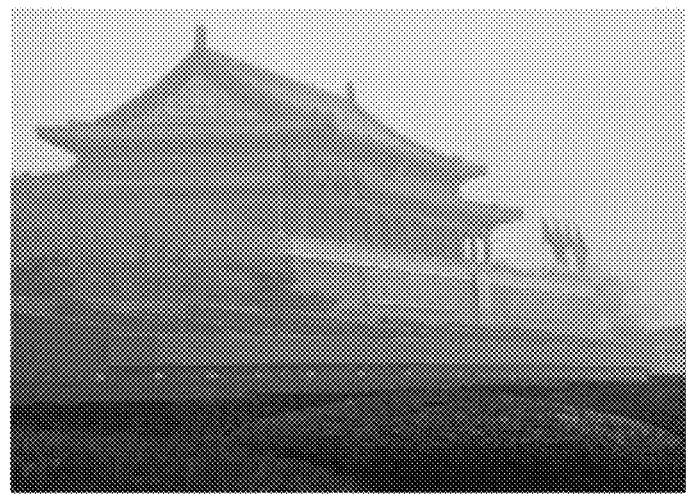
FIG. 8A, FIG. 8B and FIG. 8C illustrate an example of a restored image according to the present invention.
Figure 8B:
Figure 8C:
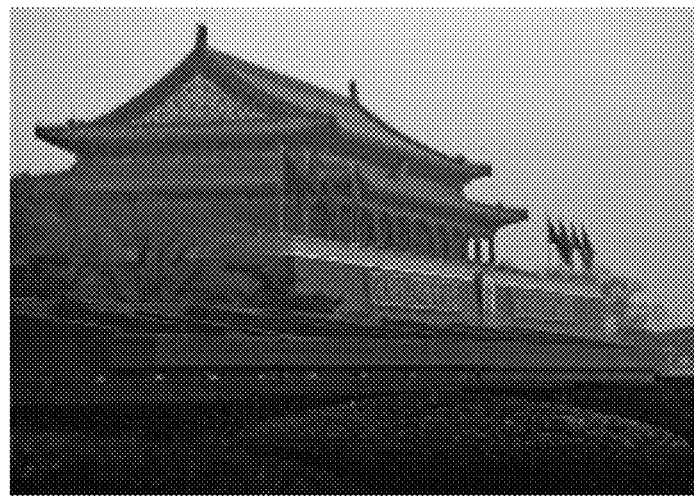

FIG. 8A, FIG. 8B and FIG. 8C illustrate an example of a restored image according to the present invention. FIG. 8A shows an input image, FIG. 8B shows a restored image using the transmission map before refinement and FIG. 8C shows a restored image using the transmission map after refinement.

Referring to FIG. 8B, it is assumed that a result using the pixel-based transmission map is obtained without halo artifact. In this case, there is no information sharing of the adjacent pixels, thereby causing loss in color contrast. However, referring to FIG. 8C, L1-norm regularization is used to prevent loss in color contrast after haze removal. As a result, it can be confirmed that the result is better than that of FIG. 8B.

In addition, embodiments of the present invention may be implemented in the form of program instructions that can be executed through various computer means and recorded in a computer-readable medium. The computer-readable medium may include program instructions, data files, data structures, etc., alone or in combination. The program instructions recorded on the medium can be designed and configured specifically for the present invention or can be a type of medium known to and used by the skilled person in the field of computer software. The computer readable recording medium may include magnetic media such as a hard disc, a floppy disc, and a magnetic tape, optical media such as a compact disc read only memory (CD-ROM) and a digital versatile disc (DVD), magneto-optical media such as a floptical disk, and hardware devices specifically configured to store and execute program commands, such as a read only memory (ROM), a random access memory (RAM), and a flash memory. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

Hereinabove, although the present invention is described by specific matters, exemplary embodiments, and drawings, they are provided only for assisting in the entire understanding of the present invention. Therefore, the present invention is not limited to the exemplary embodiments. Various modifications and changes may be made by those skilled in the art to which the present invention pertains from this description. Therefore, the spirit of the present invention should not be limited to the above-described exemplary embodiments, and the following claims as well as all modified equally or equivalently to the claims are intended to fall within the scope and spirit of the invention.

What is claimed is:

1. An apparatus for performing an operation of removing haze included in an image, comprising:
   memory configured to store computer-readable instructions; and
   a processor configured to execute the instructions,
   wherein the processor calculates a hazy value and a transmission map using an input image including a hazy component and generates a restored image from which the hazy component has been removed using the hazy value and the transmission map;
   wherein the processor selects a first area in the input image, calculates a fuzzy membership function of pixels of the input image with respect to the hazy value using brightness values of the pixels of the input image and brightness values of pixels of the first area, and calculates the transmission map using the brightness values of pixels of the first area and the fuzzy membership function;
   wherein a function value of the fuzzy membership function is determined using a brightness value A that is a minimum value of the brightness values of the pixels of the input image, a brightness value B that is a maximum value of the brightness values of the pixels of the input image, a brightness value C that is a minimum value of the brightness values of the first area, and a brightness value D that is a maximum value of the brightness values of the first area; and
   wherein the processor calculates the transmission map using a fuzzy membership function for a R channel of the pixels of the input image, a fuzzy membership function for a G channel of the pixels of the input image, a fuzzy membership function for a B channel of the pixels of the input image, a mean value of the brightness value C and the brightness value D for the R channel, a mean value of the brightness value C and the brightness value D for the G channel, and a mean value of the brightness value C and the brightness value D for the B channel.

2. The apparatus of claim 1, wherein the processor determines the function value for each of the pixels of the input image, wherein when a brightness value of a pixel of the input image is less than the brightness value A or greater than the brightness value B, the fuzzy membership function has a function value of 0, wherein when a brightness value of a pixel of the input image is greater than or equal to the brightness value C and less than or equal to the brightness value D, the fuzzy membership function has a function value of 1, wherein when the brightness value of a pixel of the input image is greater than or equal to the brightness value A and less than the brightness value C, the fuzzy membership function has a function value of "1−(the brightness value C−the brightness value of the pixel of the input image)/(the brightness value C−the brightness value A)", and wherein when the brightness value of a pixel of the input image is greater than or equal to the brightness value D and less than the brightness value B, the fuzzy membership function has a function value of "1−(the brightness value of the pixel of the input image−the brightness value D)/(the brightness value B−the brightness value D)".

3. The apparatus of claim 2, wherein the fuzzy membership function, brightness values of the pixel of the input image, the brightness value A, the brightness value B, the brightness value C, and the brightness value D is calculated or determined for each of R, G, and B channels.

4. The apparatus of claim 1, wherein the transmission map is expressed by the following equation:

$$T = 1 - \omega \cdot \frac{\mu_{g^R} \times \text{mean } A^R + \mu_{g^G} \times \text{mean } A^G + \mu_{g^B} \times \text{mean } A^B}{\text{mean } A^R + \text{mean } A^G + \text{mean } A^B}$$

where T is the transmission map, $\mu_{g^R}$ is the fuzzy membership function value for the R channel, $\mu_{g^G}$ is the fuzzy membership function value for the G channel, $\mu_{g^B}$ is the fuzzy membership function value for the B channel, mean $A^R$ is the mean value of the brightness value C and the brightness value D of the R channel, mean $A^G$ is the mean value of the brightness value C and the brightness value D for the G channel, mean $A^B$ is the mean value of the brightness value C and the brightness value D for the B channel, and ω is a parameter to control the amount of haze removal.

5. The apparatus of claim 1, wherein the first area is an area having the maximum mean brightness value in the input image.

6. The apparatus of claim 1, wherein the processor refines the transmission map using L1-norm regularization technique and generates the restored image using the refined transmission map.

7. A method for removing haze from an image, the method being performed by an apparatus including a processor, the method comprising the steps of:
calculating a hazy value and a transmission map using an input image including a hazy component; and
generating a restored image from which the hazy component has been removed using the hazy value and the transmission map,
wherein the step of calculating selects a first area in the input image, calculates a fuzzy membership function of pixels of the input image with respect to the hazy value using brightness values of the pixels of the input image and brightness values of pixels of the first area, and calculates the transmission map using the brightness values of pixels of the first area and the fuzzy membership function;
wherein a function value of the fuzzy membership function is determined using a brightness value A that is a minimum value of the brightness values of the pixels of the input image, a brightness value B that is a maximum value of the brightness values of the pixels of the input image, a brightness value C that is a minimum value of the brightness values of the first area, and a brightness value D that is a maximum value of the brightness values of the first area; and
wherein the transmission map is calculated using a fuzzy membership function for a R channel of the pixels of the input image, a fuzzy membership function for a G channel of the pixels of the input image, a fuzzy membership function for a B channel of the pixels of the input image, a mean value of the brightness value C and the brightness value D for the R channel, a mean value of the brightness value C and the brightness value D for the G channel, and a mean value of the brightness value C and the brightness value D for the B channel.

8. A computer program product stored on a non-transitory computer-readable medium, comprising instructions for causing a computer to execute the steps of:
calculating a hazy value and a transmission map using an input image including a hazy component; and
generating a restored image from which the hazy component has been removed using the hazy value and the transmission map,
wherein the step of calculating selects a first area in the input image, calculates a fuzzy membership function of pixels of the input image with respect to the hazy value using brightness values of the pixels of the input image and brightness values of pixels of the first area, and calculates the transmission map using the brightness values of pixels of the first area and the fuzzy membership function;
wherein a function value of the fuzzy membership function is determined using a brightness value A that is a minimum value of the brightness values of the pixels of the input image, a brightness value B that is a maximum value of the brightness values of the pixels of the input image, a brightness value C that is a minimum value of the brightness values of the first area, and a brightness value D that is a maximum value of the brightness values of the first area; and
wherein the transmission map is calculated using a fuzzy membership function for a R channel of the pixels of the input image, a fuzzy membership function for a G channel of the pixels of the input image, a fuzzy membership function for a B channel of the pixels of the input image, a mean value of the brightness value C and the brightness value D for the R channel, a mean value of the brightness value C and the brightness value D for the G channel, and a mean value of the brightness value C and the brightness value D for the B channel.

* * * * *